(12) United States Patent
Mitsui et al.

(10) Patent No.: US 12,302,932 B2
(45) Date of Patent: May 20, 2025

(54) BEVERAGE HAVING FOAM RETENTIVITY AND METHOD FOR IMPROVING FOAM RETENTIVITY OF BEVERAGE

(71) Applicant: SUNTORY HOLDINGS LIMITED, Osaka (JP)

(72) Inventors: Ryoki Mitsui, Kanagawa (JP); Soichiro Urai, Kanagawa (JP); Yoshiaki Yokoo, Kanagawa (JP); Koji Nagao, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 515 days.

(21) Appl. No.: 17/632,551

(22) PCT Filed: Aug. 7, 2020

(86) PCT No.: PCT/JP2020/030303
§ 371 (c)(1),
(2) Date: Feb. 3, 2022

(87) PCT Pub. No.: WO2021/029338
PCT Pub. Date: Feb. 18, 2021

(65) Prior Publication Data
US 2022/0312798 A1    Oct. 6, 2022

(30) Foreign Application Priority Data

Aug. 9, 2019    (JP) .................. 2019-148020

(51) Int. Cl.
| A23L 2/52 | (2006.01) |
| A23L 2/54 | (2006.01) |
| A23L 2/60 | (2006.01) |
| A23L 2/72 | (2006.01) |
| A23L 2/78 | (2006.01) |

(52) U.S. Cl.
CPC .......... *A23L 2/52* (2013.01); *A23L 2/54* (2013.01); *A23L 2/60* (2013.01); *A23L 2/72* (2013.01); *A23L 2/78* (2013.01)

(58) Field of Classification Search
None
See application file for complete search history.

(56) References Cited

U.S. PATENT DOCUMENTS

| 2013/0071521 A1* | 3/2013 | Lee ............... A23L 2/54 426/598 |
| 2016/0039856 A1 | 2/2016 | Prakash et al. |
| 2017/0006906 A1 | 1/2017 | Jackson |
| 2017/0362268 A1 | 12/2017 | Carlson et al. |
| 2018/0055080 A1 | 3/2018 | Erickson et al. |
| 2019/0116836 A1 | 4/2019 | Nakajima et al. |
| 2019/0174806 A1 | 6/2019 | Erickson et al. |
| 2019/0289890 A1 | 9/2019 | Wang et al. |
| 2019/0352324 A1 | 11/2019 | Iwaki et al. |
| 2020/0055889 A1 | 2/2020 | Carlson et al. |
| 2020/0137974 A1 | 5/2020 | Markosyan |
| 2020/0170209 A1 | 6/2020 | Iwaki et al. |
| 2020/0224235 A1 | 7/2020 | Iwaki et al. |
| 2020/0277322 A1 | 9/2020 | Prakash et al. |
| 2020/0377541 A1 | 12/2020 | Purkayastha et al. |
| 2021/0145027 A1 | 5/2021 | Itoyama et al. |
| 2021/0198303 A1 | 7/2021 | Carlson et al. |

(Continued)

FOREIGN PATENT DOCUMENTS

| AU | 2020320849 | 3/2022 |
| AU | 2020323449 | 3/2022 |

(Continued)

OTHER PUBLICATIONS

Prakash et al., Development of next generation stevia sweetener, Foods, 2014, 3-162-175 (Year: 2014).*
Office Action issued in CL Patent Appl. No.translation.
Extended European Search Report issued in EP Patent Appl. No. 20853301.8 on Aug. 9, 2023.
Perera et al., "Assignment of Sugar Arrangement in Branched Steviol Glycosides Using Electrospray Ionization Quadrupole Time-of-Flight Tandem Mass Spectrometry", *Rapid Commun. Mass. Spectrom.*, vol. 31, pp. 315-324 (2017).

(Continued)

*Primary Examiner* — Jyoti Chawla
(74) *Attorney, Agent, or Firm* — GREENBLUM & BERNSTEIN. P.L.C.

(57) ABSTRACT

The present invention provides: a novel beverage having foam retentivity; and a method for improving foam retentivity. The present invention provides a beverage containing rebaudioside D and a compound represented by formula (1)(in the formula, $R_1$ represents Xyl(1-2)Glc1-, and $R_2$ represents Glc(1-2)[Glc(1-3)]Glc1-, Glc represents glucose, and Xyl represents xylose), wherein the sum of the content of rebaudioside D and the compound represented by formula (1) is 30-600 ppm, and the content of the compound represented by formula (1) in terms of mass is 0.5-95% of the aforementioned sum.

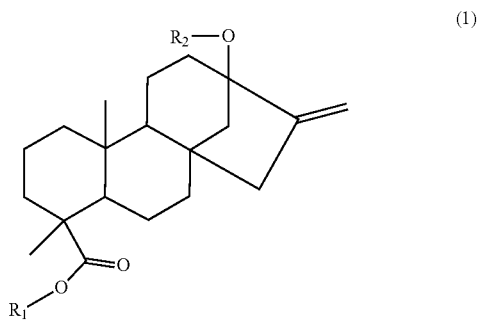

(1)

12 Claims, 3 Drawing Sheets

(56) References Cited

U.S. PATENT DOCUMENTS

| | | |
|---|---|---|
| 2021/0246156 A1 | 8/2021 | Markosyan et al. |
| 2022/0256902 A1 | 8/2022 | Urai et al. |
| 2022/0380824 A1 | 12/2022 | Markosyan et al. |
| 2023/0232878 A1 | 7/2023 | Erickson et al. |

FOREIGN PATENT DOCUMENTS

| | | |
|---|---|---|
| CL | 2021002161 | 2/2022 |
| CL | 2021003265 | 9/2022 |
| CL | 2022000223 | 9/2022 |
| EP | 3430911 | 1/2019 |
| EP | 3483171 | 5/2019 |
| EP | 3564251 | 11/2019 |
| EP | 3569707 | 11/2019 |
| EP | 3611179 | 2/2020 |
| JP | 3436317 | 8/2003 |
| JP | 2017-216931 | 12/2017 |
| JP | 2018-501235 | 1/2018 |
| JP | 2019-013216 | 1/2019 |
| WO | 2014/146135 | 9/2014 |
| WO | 2016/100689 | 6/2016 |
| WO | 2017/171000 | 10/2017 |
| WO | 2018/044588 | 3/2018 |
| WO | 2018/090020 | 5/2018 |
| WO | 2018/102648 | 6/2018 |
| WO | 2018/124142 | 7/2018 |
| WO | 2018/124143 | 7/2018 |
| WO | 2018/181515 | 10/2018 |
| WO | 2019/217474 | 11/2019 |
| WO | 2020/138310 | 7/2020 |
| WO | 2021/020516 | 2/2021 |
| WO | 2021/020517 | 2/2021 |

OTHER PUBLICATIONS

Perera et al., "Development of a High-Performance Liquid Chromatography Procedure to Identify Known and Detect Novel C-13 Oligosaccharide Moieties in Diterpene Glycosides from *Stevia rebaudiana* (Bertoni) Bertoni (Asteraceae): Structure Elucidation of Rebaudiosides V and W", *J. Sep. Sci.*, vol. 40, pp. 3771-3781 (2017).

Perera et al., "Rebaudiosides T and U, Minor C-19 Xylopyranosyl and Arabinopyranosyl Steviol Glycoside Derivatives from *Stevia rebaudiana* (Bertoni) Bertoni", *Phytochemistry*, vol. 135, pp. 106-114 (2017).

International Search Report for PCT/JP2020/029271, mailed Oct. 13, 2020, along with an English-language translation.

Notice of Reasons for Refusal issued in JP Patent Appl. No. 2021-535430 on Aug. 31, 2021, along with a machine English-language translation.

International Search Report for PCT/JP2020/030303, mailed Oct. 13, 2020, along with an English-language translation.

International Search Report for PCT/JP2020/029272, mailed Oct. 13, 2020, along with an English-language translation.

* cited by examiner

Figure 1(a) TEST INSTRUMENT
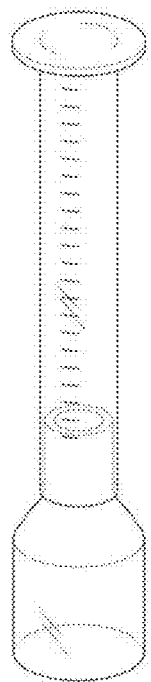
Figure 1(b) CRITERION FOR DETERMINING FOAM DISAPPEARANCE
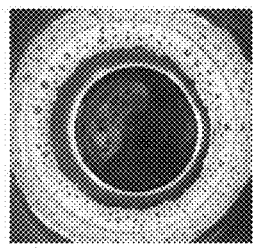

FOAM RETENTION TIME (SAMPLES HAVING HIGH GLYCOSIDE A CONTENT)

FOAM RETENTION TIME (SAMPLES HAVING LOW GLYCOSIDE A CONTENT)

BEVERAGE HAVING FOAM RETENTIVITY AND METHOD FOR IMPROVING FOAM RETENTIVITY OF BEVERAGE

TECHNICAL FIELD

The present invention relates to a beverage having foam retention, and a method for improving foam retention in a beverage.

BACKGROUND ART

Beverages having foam retention are by preference drunk by a broad range of consumers. Beverages having foam retention commercially available at present are diversified, but many thereof are carbonated beverages and have such characteristics as giving visual pleasure to drinkers by foaming when containers are opened or when the beverages are poured in containers such as glasses, and giving a through-throat refreshing feeling to drinkers.

In recent years, also in various beverages such as coffee beverages, not limited to carbonated beverages, there are demanded beverages retaining gas bubbles (foam) generated when the beverages are poured in containers; there have been reported so far various effervescent beverages, beverage foam-quality improving agents and the like. Patent Literature 1 reports an effervescent beverage containing a predetermined amount of saponin and a thickener having a gelation temperature of 50° C. or lower. Patent Literature 2 reports a beverage foam-quality improving agent containing decomposed products of rice bran protein, and a beverage containing the same.

CITATION LIST

Patent Literature

[Patent Literature 1] Japanese Patent Laid-Open No. 2019-13216
[Patent Literature 2] Japanese Patent Laid-Open No. 2017-216931

SUMMARY OF INVENTION

Problem to be Solved by the Invention

From the above situation, a novel beverage having foam retention and a method for improving foam retention are now demanded.

Means for Solving the Problems

The present inventors have found that by making a beverage to contain predetermined amounts of rebaudioside D (hereinafter, referred to also as "Reb.D") and a steviol glycoside having a specific structure, the foam retention of the beverage can be improved unexpectedly. The present invention is based on this finding.

The present invention includes the following aspects.

[1]

A beverage comprising:

rebaudioside D; and a compound represented by Formula (1) below:

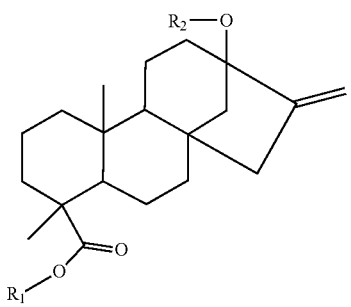

wherein $R_1$ represents Xyl(1-2)Glc1-; and $R_2$ represents Glc(1-2)[Glc(1-3)]Glc1-, where Glc represents glucose, and Xyl represents xylose, or a salt or a hydrate thereof;

wherein a total content of rebaudioside D and the compound of Formula (1), or a salt or a hydrate thereof is 30 to 600 ppm; and a content of the compound of Formula (1), or a salt or a hydrate thereof is 0.5 to 95% in terms of mass with respect to the total content.

[2]

The beverage according to [1], wherein the content of rebaudioside D is 10 to 300 ppm.

[3]

The beverage according to [1] or [2], wherein the content of the compound of Formula (1), or a salt or a hydrate thereof is 1 to 400 ppm.

[4]

The beverage according to any one of [1] to [3], wherein the total content is 150 to 400 ppm.

[5]

The beverage according to any one of [1] to [4], wherein the content of the compound of Formula (1), or a salt or a hydrate thereof is 0.5 to 25% in terms of mass with respect to the total content.

[6]

The beverage according to any one of [1] to [4], wherein the content of the compound of Formula (1), or a salt or a hydrate thereof is 25% to 95% in terms of mass with respect to the total content.

[7]

The beverage according to any one of [1] to [6], wherein the compound of Formula (1) is a compound represented by Formula (3) below:

(3)

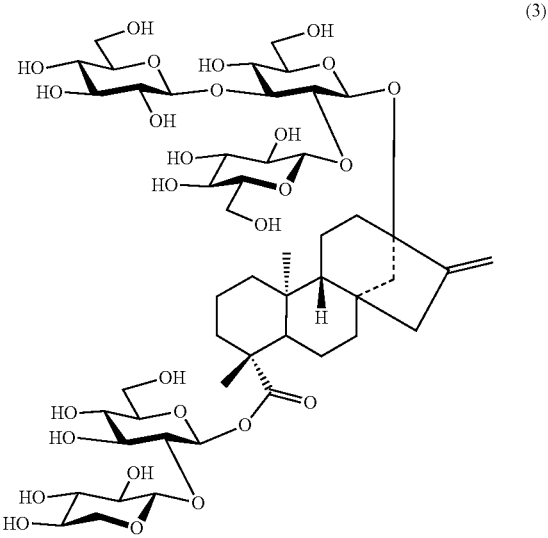

[8]

The beverage according to any one of [1] to [7], further comprising one or more steviol glycosides selected from the group consisting of rebaudioside A, rebaudioside B, rebaudioside C, rebaudioside E, rebaudioside F, rebaudioside G, rebaudioside I, rebaudioside J, rebaudioside K, rebaudioside M, rebaudioside N, rebaudioside O, rebaudioside Q, rebaudioside R, dulcoside A, rubusoside, steviol monoside, steviol bioside and stevioside.

[9]

The beverage according to any one of [1] to [8], wherein the beverage is a sparkling beverage.

[10]

The beverage according to any one of [1] to [9], having Brix in terms of sucrose of 1 to 13.

[11]

The beverage according to any one of [1] to [10], having an alcohol content of lower than 0.05 v/v %.

[12]

A method for improving foam retention of a beverage, comprising adding rebaudioside D and a compound represented by Formula (1) below:

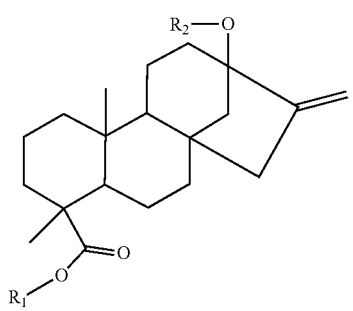

(1)

wherein $R_1$ represents Xyl(1-2)Glc1-; and $R_2$ represents Glc(1-2)[Glc(1-3)]Glc1-, where Glc represents glucose, and Xyl represents xylose,
or a salt or a hydrate thereof;
to the beverage.

Advantageous Effects of Invention

According to the present invention, there can be provided a beverage having foam retention and a method for improving foam retention in a beverage. A beverage according to one aspect of the present invention can bring on a longer foam retention time than beverages containing Reb.D alone as their sweetener. Further, a beverage according to another aspect of the present invention can more reduce lingering sweet aftertaste than beverages containing Reb.D alone as their sweetener.

BRIEF DESCRIPTION OF DRAWINGS

FIG. 1(a) is a schematic view of instruments used for a foam retention test. FIG. 1(b) is a photograph indicating a criterion for determining the timing when foam disappears in a foam retention test.

FIG. 2(a) shows the foam retention time in proportions of Glycoside A to a purified Reb.D of 0.0% and 25.0% to 100.0%; and FIG. 2(b) shows the foam retention time in proportions of Glycoside A to the purified Reb.D of 0.0 to 20.0%.

DESCRIPTION OF EMBODIMENTS

Figure 2A:
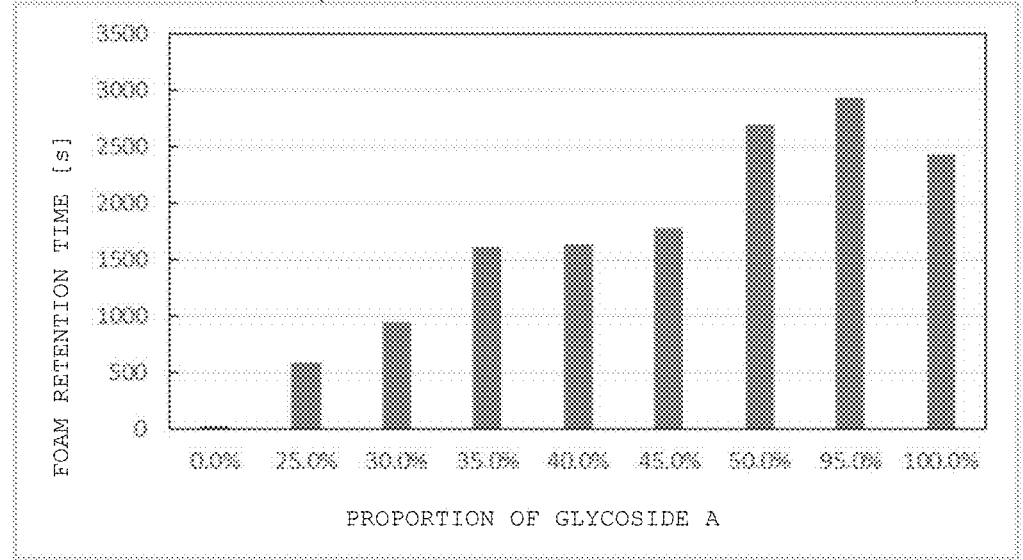
FIGS. 2(a) and 2(b) are graphs showing the foam retention time and the foaming amount in various proportions of Glycoside A.

Hereinafter, the present invention will be described in detail. The following embodiments are provided for illustrating the present invention with no purport of limiting the present invention solely to the embodiments. The present invention may be carried out in various modes without departing from the gist thereof. All of the literatures, publications, patent publications and other patent literatures cited in the present description are incorporated herein by reference. The present specification incorporates the contents of the specification and the drawings of Japanese Patent Application No. 2019-148020, filed on Aug. 9, 2019, from which the present application claims priority.

In the present description, "rebaudioside", "Reb" and "Reb." represent the same meaning, and any thereof means "rebaudioside". Similarly, in the present description, "dulcoside" means "dulcoside".

In the present description, "ppm" means, unless otherwise specified, "mass ppm". Since the specific gravity of usual beverages is 1, "mass ppm" and "mg/L" can be used alike. Further in the present description, "room temperature" means "about 25° C.". In the present description, "about" means "within the range of ±10% of a numerical value following the "about".

1. A Beverage Having Foam Retention

As described above, the present inventors have acquired a beverage having foam retention unexpectedly by making the beverage to contain predetermined amounts of Reb.D and a steviol glycoside having a specific structure (hereinafter, referred to also as "Glycoside A"). Glycoside A is a compound represented by Formula (1) below:

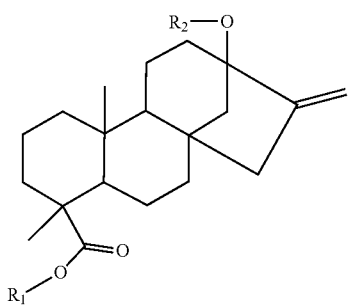

(1)

wherein $R_1$ represents Xyl(1-2)Glc1-; and $R_2$ represents Glc(1-2)[Glc(1-3)]Glc1-, where Glc represents glucose, and Xyl represents xylose, or a salt or a hydrate thereof. Here, a glucose moiety and a xylose moiety in a sugar chain are referred to also as glucopyranosyl and xylopyranosyl, respectively.

Therefore, a beverage according to one aspect of the present invention comprises Reb.D and Glycoside A, wherein the total content of the rebaudioside D and Glycoside A is 30 to 600 ppm, and the content of Glycoside A is 0.5 to 95% in terms of mass with respect to the total content.

[Rebaudioside D (Reb.D)]

Rebaudioside D contained in the beverage according to the present invention has a structure in which 5 sugar moieties attach to a diterpene backbone, and is specifically represented by the following chemical formula.

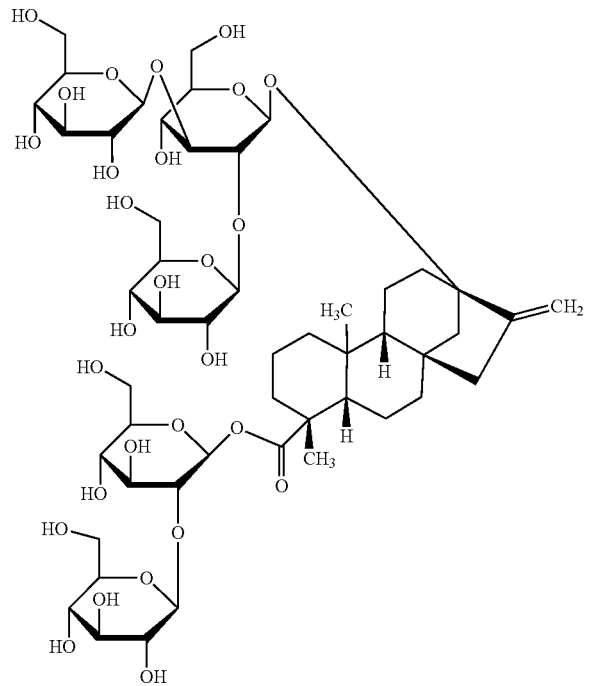

Reb.D has very strong sweetness (about 300 times the sweetness of sugar), and is better in respects of aftertaste and the like than Reb.A, which has been usually broadly distributed. Reb.D to be used for the beverage according to the present invention is not especially limited, but may be a plant-derived product, a chemically synthesized product or a biosynthetic product. For example, it may be isolated and purified from a plant body rich in Reb.D, but may be obtained by a chemical synthesis or a biosynthesis. Reb.D to be used for the beverage according to the present invention may not be a 100%-purity one, and may be a mixture with other steviol glycosides. In one aspect of the present invention, Reb.D is a purified stevia extract, which may contain other steviol glycosides other than Reb.D. Alternatively, Reb.D may be one obtained by decomposing Reb.M. Alternatively, Reb.D may be a commercially available purified Reb.D product.

[Glycoside A]

Glycoside A contained in the beverage according to the present invention is a compound represented by Formula (1) or a salt or a hydrate thereof as described above. As can be understood by the formula, Glycoside A is a steviol glycoside having a sugar chain containing three glucose moieties at C-13 of steviol and one glucose moiety and one xylose moiety at C-19 of steviol. In Formula (1), Glc represents glucose and Xyl represents xylose. As used herein, "Glc" may be α- or β-glucose while Xyl may be α- or β-xylose. Alternatively, as used herein, Glc may be α- and β-glucose while Xyl may be α- and β-xylose. Moreover, "Glc1-" indicates that the carbon atom at C-1 of glucose is attached to steviol via a glycosidic bond, and "Glc(1-3)-Glc1-" indicates that the carbon atom at C-3 of glucose represented by "Glc1-" is attached to a carbon atom at C-1 of another glucose via a glycosidic bond. Furthermore, "Xyl(1-2)-Glc1-" indicates that the carbon atom at C-2 of glucose represented by "Glc1-" is attached to the carbon atom at C-1 of xylose via a glycosidic bond.

Examples of Glycoside A include glycosides having the structures represented by Formulae (2), (2)', (3) and (3)'.

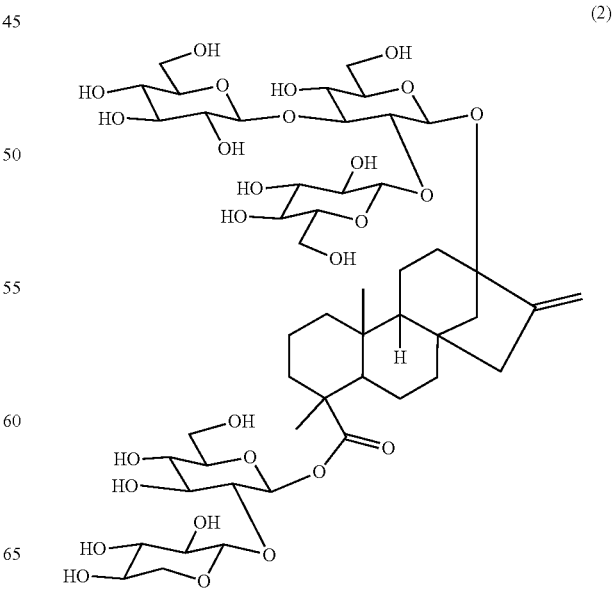

(2)

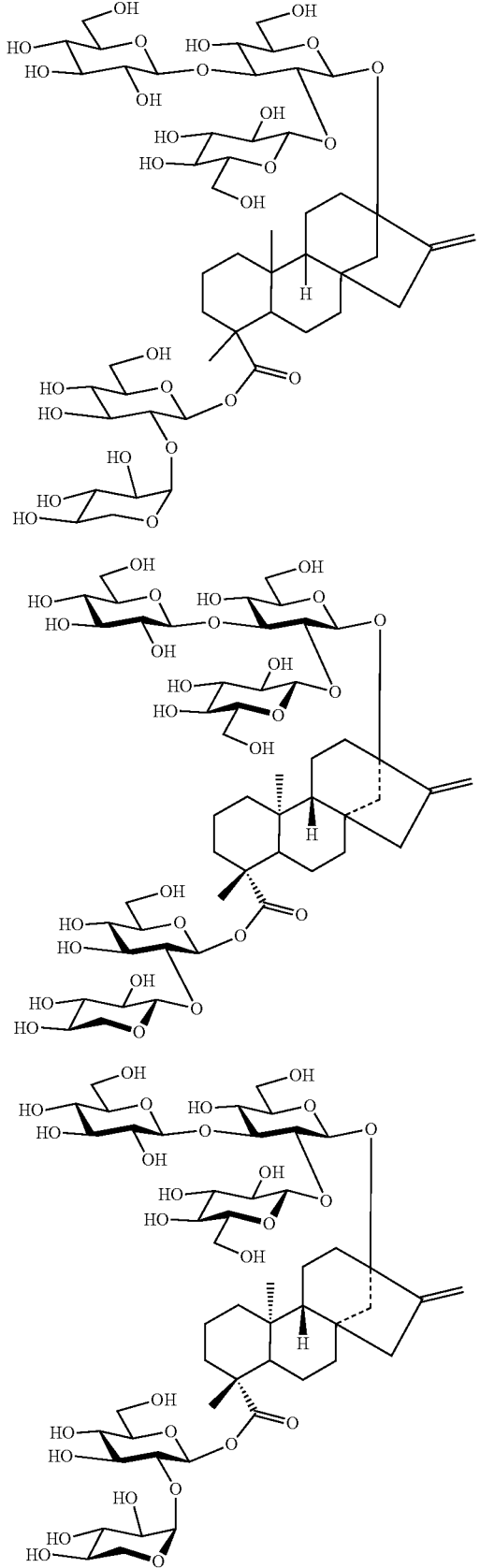

In Glycoside A represented by Formula (2), glucose is attached to the carboxylic group at C-19 of steviol via a β-glycosidic bond and xylose is attached to said glucose via a β1-2 bond, whereas in Glycoside A represented by Formula (2)', glucose is attached to the carboxylic group at C-19 of steviol via a β-glycosidic bond, and xylose is attached to said glucose via an α1-2 bond. Formulae (3) and (3)' represent structures having further specified conformations of Glycosides A represented by Formulae (2) and (2)', respectively.

Glucoside A also comprises isomers such as the α- and β-forms as described above. Therefore, the glycoside of the present invention may comprise only the α-form, only the β-form or a mixture of the α- and β-forms. The proportion of the β-form in the glycoside of the present invention is preferably 80% or more, more preferably 90% or more, still more preferably 95% or more and particularly preferably 99% or more. The α- and β-forms can be isolated/purified by a known method such as high-performance liquid chromatography (HPLC), ultra (high) performance liquid chromatography (UPLC), or the like.

Glucoside A may not only be the compound represented by Formula (1) but may also be a derivative, a salt or a hydrate thereof. The term "derivative" as used herein refers to a compound resulting from a structural change of a minor moiety of the compound, for example, a compound in which some of the hydroxy groups are substituted with other substituents. Therefore, derivatives of the compound represented by Formula (1) include compounds in which some of the hydroxy groups contained in the compound have been substituted with a substituent selected from hydrogen, a halogen, an alkyl group, an alkenyl group, an alkynyl group, an aryl group, an amino group, a cyano group or the like. As used herein, a "salt of the compound represented by Formula (1)" refers to a physiologically acceptable salt, for example, a sodium salt, of the compound represented by Formula (1). Furthermore, a "hydrate of the compound represented by Formula (1)" as used herein refers to a compound resulting from attachment of a water molecule to the compound represented by Formula (1).

While Glucoside A to be used in the beverage according to the present invention is not particularly limited, it may be a plant-derived product, a chemically synthesized product or a biosynthetic product. For example, it may be isolated and purified from a plant body rich in Glucoside A, or it may be obtained by a chemical synthesis or a biosynthesis. When Glucoside A is prepared by a chemical synthesis, a compound of Formula (3) can be synthesized from a generally available known steviol glycoside, for example, according to Scheme 1 below:

Scheme 1: Synthetic route of compound of Formula (3)
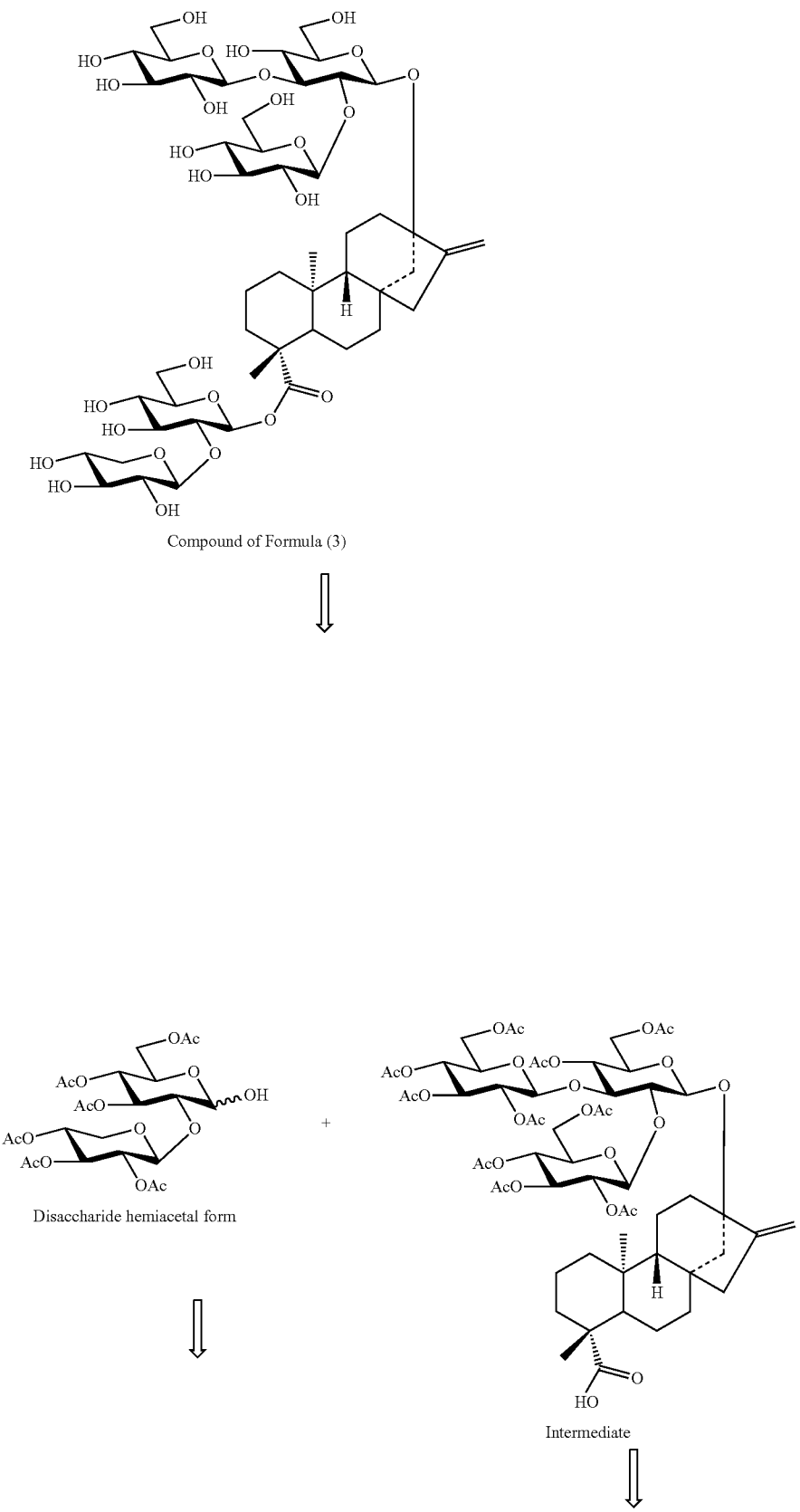

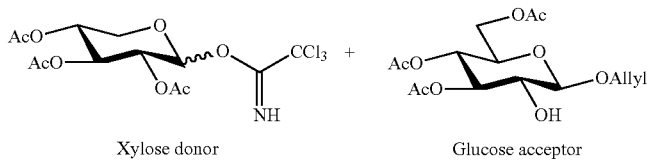

Xylose donor + Glucose acceptor

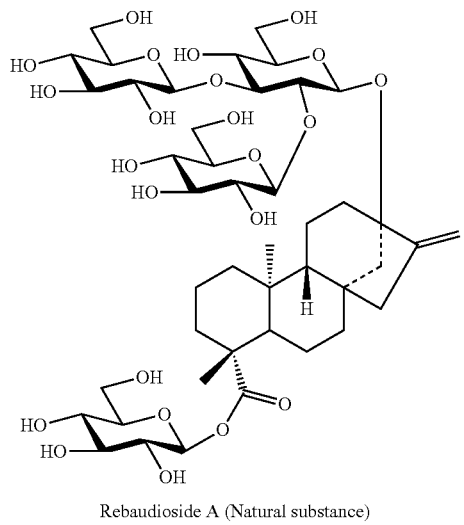

Rebaudioside A (Natural substance)

As can be appreciated from Scheme 1, for the synthesis of the compound of Formula (3), the intermediate and the disaccharide hemiacetal form may be condensed via a Mitsunobu reaction to obtain the backbone of the compound of Formula (3). For the synthesis of the intermediate, the ester bond at C-19 of steviol of the known natural substance, i.e., rebaudioside A (1), may be subjected to alkaline hydrolysis and then the hydroxy groups of the sugar chain may be protected with acetyl (Ac) groups to obtain the intermediate. For the synthesis of the disaccharide hemiacetal form, a disaccharide backbone may be produced through condensation reaction between an appropriately protected glucose acceptor and a xylose donor, and the protecting group at the anomeric carbon of the reducing end may be deprotected to give the disaccharide hemiacetal form. The resulting intermediate and disaccharide hemiacetal form may be subjected to condensation via a Mitsunobu reaction, where the reaction proceeds in a high yield with complete β-selectivity. At last, the protecting groups of the reaction product of the disaccharide hemiacetal form and said intermediate may be deprotected, thereby obtaining the compound of Formula (3). Each of the synthesis steps will be described below.

(1) Synthesis of Intermediate

The intermediate can be synthesized according to the method as described in WO2018/181515.

(2) Synthesis of Disaccharide Hemiacetal Form

The disaccharide hemiacetal form can be synthesized, for example, according to Scheme 2 below.

Scheme 2: Synthesis of disaccharide hemiacetal form

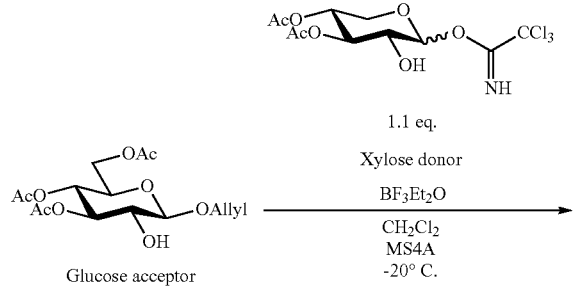

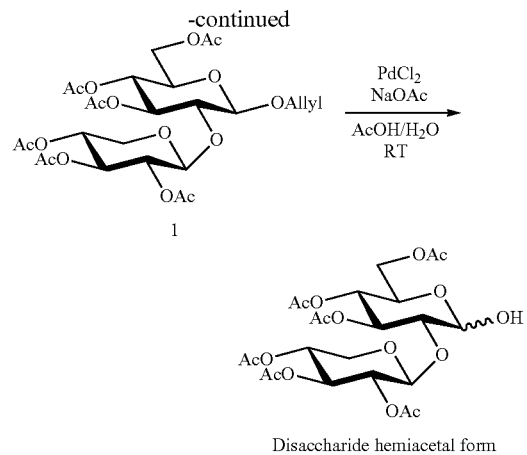

Disaccharide hemiacetal form

As can be appreciated from Scheme 2, for the synthesis of the disaccharide hemiacetal form, 1.1 equivalent of a xylose donor is added to a glucose acceptor, and dissolved with 4 Å molecular sieves in dichloromethane, to which a boron trifluoride-diethyl ether complex is added at −20° C., and the resultant is agitated at −20° C. for an hour. After confirming the completion of the reaction by TLC (ethyl acetate/hexane=1/1, Rf value=0.2), the resultant is neutralized with triethylamine (pH 8), and the 4 Å molecular sieves are removed by filtration. The resultant is concentrated under a reduced pressure to obtain syrup, which is subjected to silica gel column chromatography to give Compound 1 in the eluate (ethyl acetate/hexane=1/1). NMR spectra of the resultant compound may be determined for $^1$H-NMR and $^{13}$C-NMR using "AVANCE III HD 400 spectrometer" manufactured by Bruker.

Compound 1 is dissolved in acetic acid and water, to which palladium chloride is added at room temperature, and the resultant is agitated in an argon atmosphere at room temperature for 18 hours. After confirming the completion of the reaction by TLC (chloroform/ethyl acetate=2/1, Rf value=0.2), palladium chloride is removed by filtration. The resultant is concentrated under a reduced pressure to obtain syrup, which is subjected to silica gel column chromatography to give the disaccharide hemiacetal form in the eluate (chloroform/ethyl acetate=2/1).

(3) Synthesis of Compound of Formula (3)

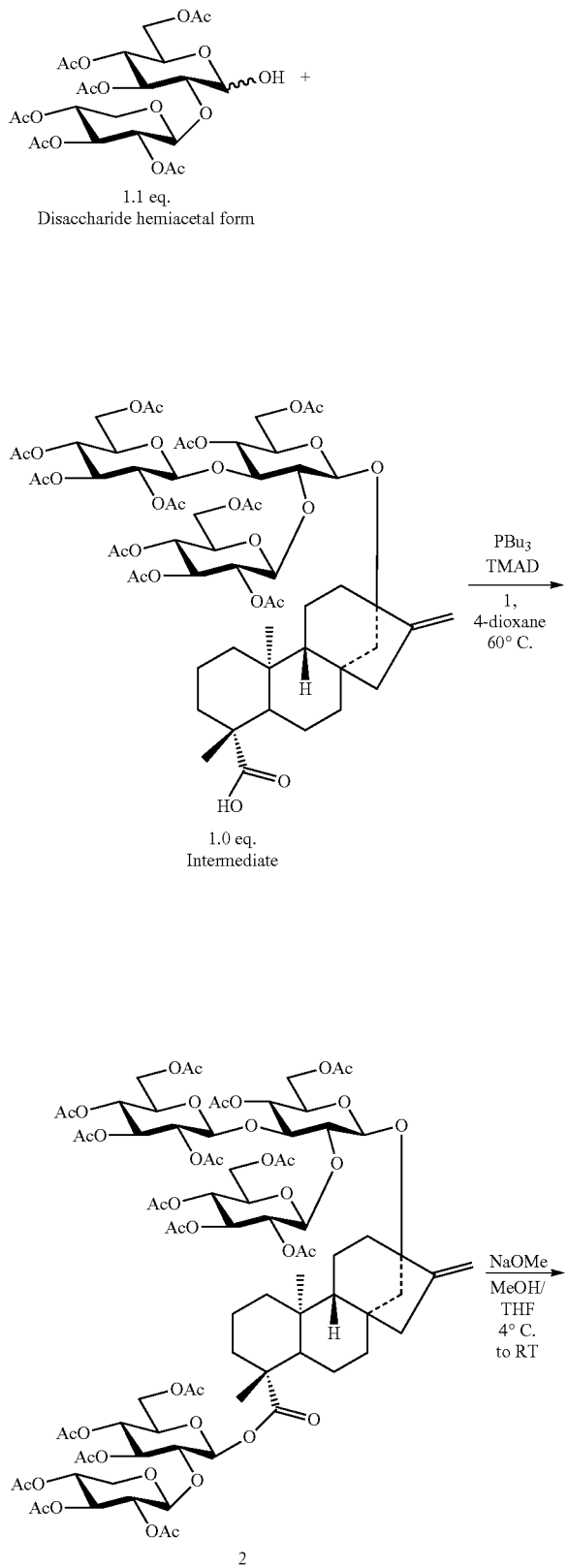

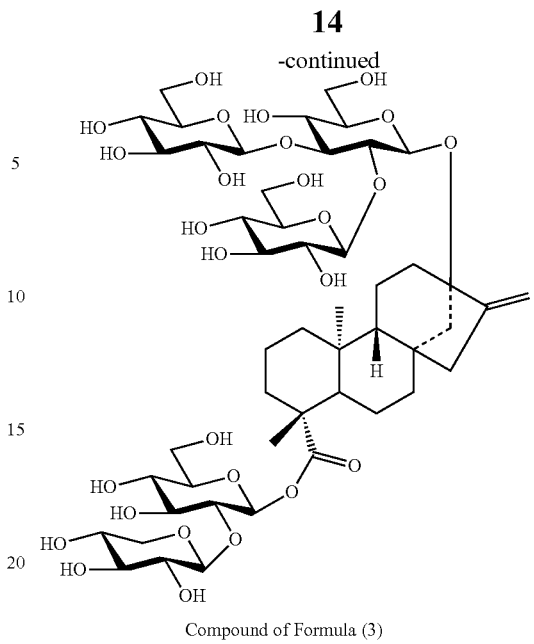

Compound of Formula (3)

As can be appreciated from Scheme 3, for the synthesis of Compound 2, the disaccharide hemiacetal form (1.1 equivalent) and the intermediate (1.0 equivalent) are dissolved in 1,4-dioxane, to which tributylphosphine and 1,1'-azobis(N, N'-dimethylformamide) (TMAD) are added at room temperature and the resultant is agitated at 60° C. for an hour. After confirming the completion of the reaction by TLC (toluene/ethyl acetate=3/2, Rf value=0.2), the resultant is diluted with ethyl acetate. The organic layer is washed with water, a saturated aqueous solution of sodium hydrogen carbonate and saturated saline, and dried with magnesium sulfate. Magnesium sulfate is removed by filtration. The resultant is concentrated under a reduced pressure to obtain syrup, which is subjected to silica gel column chromatography to give Compound 2 in the eluate (toluene/ethyl acetate=3/2).

Compound 2 is dissolved in a solvent (methanol:THF=1:1), to which sodium methoxide is added at 4° C. and the resultant is agitated at room temperature for an hour. After confirming the completion of the reaction by TLC (chloroform/methanol/water=5/4/0.1, Rf value=0.1), the resultant is neutralized by adding Amberlite 120B (H). The resultant is concentrated under a reduced pressure to obtain syrup, which is subjected to gel filtration column (GE Healthcare, Sephadex LH-20, ethanol) to give the compound of Formula (3).

Glycoside A is sweeter than sugar (sucrose), and can exert influence on the sweetness of food, beverage and the like even when comprised in a small amount. In one embodiment of the present invention, Glycoside A, for example, a compound of Formula (3), has less lingering sweet and bitter aftertastes, is sweeter than sugar and has weaker bitterness than other components including sugar.

[Beverage]

The beverage according to the present invention is not limited to a sparkling beverage such as a carbonated beverage, and may also be, for example, a coffee beverage, a tea beverage, a sports drink, a flavor water, a fruit juice drink or the like. In one aspect of the present invention, the beverage according to the present invention is a sparkling beverage. In the present description, a "sparkling beverage" is a beverage in which gas bubbles (bubbles) are generated. In the present description, gas bubbles generated in a beverage are called "bubbles", and gas bubbles formed on the liquid surface of a beverage is called "foam", in some cases. Further in the present description, "having foam retention" means that foam is generated and retained, and "improvement of foam retention" means to improve a beverage so that foam is retained for a longer time.

Examples of the sparkling beverage include carbonated beverages. The carbonated beverages are beverages containing carbon dioxide gas, which includes carbon dioxide gas separately injected in the beverages and carbon dioxide gas generated by fermentation of part of raw materials. The carbonated beverages are not especially limited to, but include soft drinks, non-alcoholic beverages and alcoholic beverages. The carbonated beverages specifically include sparkling drinks, cola, diet cola, ginger ale, cider, fruits juice flavor carbonated beverages and carbonated water imparted with fruit juice flavor, but are not limited thereto.

A beverage according to one aspect of the present invention comprises Reb.D and Glycoside A. In the present description, comprising Reb.D and Glycoside A is not limited to the case where Reb.D and Glycoside A are added as a mixture to the beverage, and includes also the case where Reb.D and Glycoside A are separately added to the beverage. That is, examples of the case where Reb.D and Glycoside A are made to be contained in a beverage include the case where a sweetness substance containing both of Reb.D and Glycoside A, which is a sweetness substance extracted from Stevia plants, is added to a beverage, the case where a mixed sweet composition of a purified Reb.D and a purified Glycoside A is added to a beverage, and the case where the purified substances thereof are added separately to a beverage.

The total content of Reb.D and Glycoside A in the beverage according to the present invention is 30 to 600 ppm. By making the total content in this range, the foam retention of the beverage according to the present invention is improved. In another aspect of the present invention, the total content of Reb.D and Glycoside A in the beverage may be 40 to 600 ppm, 50 to 600 ppm, 70 to 600 ppm, 80 to 600 ppm, 90 to 600 ppm, 100 to 600 ppm, 110 to 590 ppm, 120 to 580 ppm, 130 to 570 ppm, 140 to 560 ppm, 150 to 550 ppm, 160 to 540 ppm, 170 to 530 ppm, 180 to 520 ppm, 190 to 510 ppm, 200 to 500 ppm, 210 to 490 ppm, 220 to 480 ppm, 230 to 470 ppm, 240 to 460 ppm, 250 to 450 ppm, 260 to 440 ppm, 270 to 430 ppm, 280 to 420 ppm, 290 to 410 ppm, 300 to 400 ppm, 300 to 350 ppm, 300 to 600 ppm, 310 to 590 ppm, 320 to 580 ppm, 330 to 570 ppm, 340 to 560 ppm, 350 to 550 ppm, 360 to 540 ppm, 370 to 530 ppm, 380 to 520 ppm, 390 to 510 ppm, 400 to 500 ppm, 380 to 520 ppm, 115 to 500 ppm, 120 to 470 ppm, 150 to 450 ppm, 180 to 420 ppm, 200 to 400 ppm, 220 to 380 ppm, 250 to 350 ppm, 250 to 500 ppm, 280 to 480 ppm, or 300 to 450 ppm, and is preferably 150 to 400 ppm, and more preferably 170 to 300 ppm. Reb.D and Glycoside A have natural sweetness near that of sucrose, and when the total content thereof is in the above range, Reb.D and Glycoside A bring on the foam retention effect, while preferable sweetness can be imparted to the beverage. In one aspect of the present invention, the beverage comprising Reb.D and Glycoside A can bring on a longer foam retention time than beverages containing Reb.D alone as their sweetener. The total content of Reb.D and Glycoside A in the beverage may be calculated from the amount of raw materials added, or may be measured by using a well-known analysis method such as liquid chromatography.

The content of Reb.D in the beverage according to one aspect of the present invention is 10 to 300 ppm. In another aspect of the present invention, the content of Reb.D in the beverage may be 20 to 300 ppm, 30 to 300 ppm, 40 to 300 ppm, 50 to 300 ppm, 60 to 290 ppm, 70 to 280 ppm, 80 to 270 ppm, 90 to 260 ppm, 100 to 250 ppm, 110 to 240 ppm, 120 to 230 ppm, 130 to 220 ppm, 140 to 210 ppm, 150 to 200 ppm, 50 to 250 ppm, 100 to 250 ppm, 100 to 300 ppm, 150 to 300 ppm, or 200 to 300 ppm, and is preferably 20 to 250 ppm. Reb.D has natural sweetness near that of sucrose, and when the content thereof is in the above range, Reb.D brings on the foam retention effect, while preferable sweetness can be imparted to the beverage. The content of Reb.D in the beverage may be calculated from the amount of raw materials added, or may be measured by using a well-known analysis method such as liquid chromatography.

The content of Glycoside A (a compound represented by Formula (1), or a salt or a hydrate thereof) in the beverage according to one aspect of the present invention is 1 to 400 ppm. In another aspect of the present invention, the content of Glycoside A in the beverage may be 2 to 400 ppm, 5 to 400 ppm, 10 to 400 ppm, 15 to 400 ppm, 20 to 400 ppm, 40 to 400 ppm, 1 to 200 ppm, 1 to 150 ppm, 1 to 100 ppm, 1 to 50 ppm, 5 to 200 ppm, 5 to 150 ppm, 5 to 100 ppm, 5 to 50 ppm, 10 to 200 ppm, 10 to 150 ppm, 10 to 100 ppm, 10 to 50 ppm, 50 to 400 ppm, 100 to 400 ppm, 150 to 400 ppm, 200 to 400 ppm, 250 to 400 ppm, 300 to 400 ppm, 50 to 350 ppm, 100 to 350 ppm, 150 to 350 ppm, 200 to 350 ppm, 250 to 350 ppm, 300 to 350 ppm, 50 to 300 ppm, 100 to 300 ppm, 150 to 300 ppm, 200 to 300 ppm, 250 to 300 ppm, 50 to 250 ppm, 100 to 250 ppm, 150 to 250 ppm, or 200 to 250 ppm. Since Glycoside A has natural sweetness near that of sucrose, and when the content thereof is in the above range, Glycoside A brings on the foam retention effect, while preferable sweetness can be imparted to the beverage. Further in another aspect of the present invention, from the viewpoint of improving lingering sweet aftertaste, it is preferable that the content of Glycoside A be in the range of 1 to 100 ppm; and from the viewpoint of improving foam retention, it is preferable that the content of Glycoside A be in the range of 50 to 400 ppm. The content of Glycoside A in the beverage may be calculated from the amount of raw materials added, or may be measured by using a well-known analysis method such as liquid chromatography.

In the present invention, the content of a compound represented by Formula (1), or a salt or a hydrate thereof is 0.5 to 95% in terms of mass with respect to the total content of rebaudioside D and the compound represented by Formula (1), or a salt or a hydrate thereof in the beverage. That is, by making the proportion of Glycoside A in this range, the foam retention of the beverage according to the present invention is improved. In another aspect of the present invention, the proportion of Glycoside A may be 1.0 to 95%, 1.5 to 95%, 2.0 to 95%, 2.5 to 95%, 3.0 to 95%, 3.5 to 95%, 4.0 to 95%, 4.5 to 95%, 5.0 to 95%, 0.5 to 90%, 1.0 to 90%, 1.5 to 90%, 2.0 to 90%, 2.5 to 90%, 3.0 to 90%, 3.5 to 90%, 4.0 to 90%, 4.5 to 90%, 5.0 to 90%, 0.5 to 80%, 1.0 to 80%, 1.5 to 80%, 2.0 to 80%, 2.5 to 80%, 3.0 to 80%, 3.5 to 80%, 4.0 to 80%, 4.5 to 80%, 5.0 to 80%, 0.5 to 70%, 1.0 to 70%, 1.5 to 70%, 2.0 to 70%, 2.5 to 70%, 3.0 to 70%, 3.5 to 70%, 4.0 to 70%, 4.5 to 70%, 5.0 to 70%, 0.5 to 60%, 1.0 to 60%, 1.5 to 60%, 2.0 to 60%, 2.5 to 60%, 3.0 to 60%, 3.5 to 60%, 4.0 to 60%, 4.5 to 60%, 5.0 to 60%, 0.5 to 50%, 1.0 to 50%, 1.5 to 50%, 2.0 to 50%, 2.5 to 50%, 3.0 to 50%, 3.5 to 50%, 4.0 to 50%, 4.5 to 50%, 5.0 to 50%, 0.5 to 40%, 1.0 to 40%, 1.5 to 40%, 2.0 to 40%, 2.5 to 40%, 3.0 to 40%, 3.5 to 40%, 4.0 to 40%, 4.5 to 40%, 5.0 to 40%, 0.5 to 30%, 1.0 to 30%, 1.5 to 30%, 2.0 to 30%, 2.5 to 30%, 3.0 to 30%, 3.5 to 30%, 4.0 to 30%, 4.5 to 30%, 5.0 to 30%, 0.5 to 25%, 1.0 to 25%, 1.5 to 25%, 2.0 to 25%, 2.5 to 25%, 3.0 to 25%, 3.5 to 25%, 4.0 to 25%, 4.5 to 25%, 5.0 to 25%, 20 to 95%, 25 to 95%, 30 to 95%, 35 to 95%, 40 to 95%, 45 to 95%, 50 to 95%, 55 to 95%, 60 to 95%, 65 to 95%, 70 to 95%, 75 to 95%, 80 to 95%, 85 to 95%, 25 to 90%, 25 to 85%, 25 to 80%, 25 to 75%, 25 to 70%, 25 to 65%, 25 to 60%, 25 to 55%, 25 to 50%, 25 to 45%, 25 to 40%, 25 to 35%, or 40 to 60%. Further in another aspect of the present invention, from the viewpoint of improving lingering sweet aftertaste, it is preferable that the proportion of Glycoside A be in the range of 0.5 to 25%; and from the viewpoint of improving foam retention, it is preferable that the proportion of Glycoside A be in the range of 25 to 95%. Reb.D, though having less lingering sweet aftertaste than Reb.A, which is usually broadly used, still gives a sensation of lingering sweet aftertaste as compared with sucrose. The beverage according to one aspect of the present invention can more reduce lingering sweet aftertaste than beverages containing Reb.D alone as their sweetener.

pH of the beverage according to the present invention is not especially limited, but may be 2.5 to 6.0. When pH is 2.5 or higher, the beverage is not too strong in sour taste; and when pH is 6.0 or lower, the beverage also retains refreshing aftertaste. pH of the beverage according to another aspect of the present invention is 2.5 to 4.0. By making the pH in this range, generation of microbes and the like in storage can be suppressed and refreshing taste can be provided. Further in another aspect of the present invention, pH of the beverage may be 3.0 to 4.5, 2.6 to 3.9, 2.7 to 3.8, 2.8 to 3.7, 2.9 to 3.6, or 3.0 to 3.5. Then in the case of the beverage having a pH exceeding 4.0, by carrying out a filling and sealing process in an aseptic environment, or otherwise, microbic deterioration in storage can be suppressed.

The beverage according to one aspect of the present invention may comprise other steviol glycosides other than Reb.D and Reb.M. The other steviol glycosides are not especially limited, but in one aspect of the present invention, the beverage according to the present invention further comprises one or more steviol glycosides selected from the group consisting of rebaudioside A (Reb.A), rebaudioside B (Reb.B), rebaudioside C (Reb.C), rebaudioside E (Reb.E), rebaudioside F (Reb.F), rebaudioside G (Reb.G), rebaudioside I (Reb.I), rebaudioside J (Reb.J), rebaudioside K (Reb.K), rebaudioside N (Reb.N), rebaudioside O (Reb.O), rebaudioside Q (Reb.Q), rebaudioside R, (Reb.R) dulcoside A, rubusoside, steviol monoside, steviol bioside and stevioside.

In one aspect of the present invention, the content of Reb.A is 0 to 100 ppm, 1 to 100 ppm, 1 to 60 ppm, 1 to 50 ppm, 1 to 40 ppm, 1 to 30 ppm, 1 to 20 ppm, 1 to 10 ppm, or 1 to 5 ppm.

In one aspect of the present invention, the content of Reb.B is 0 to 300 ppm, 1 to 300 ppm, 1 to 200 ppm, 1 to 150 ppm, 1 to 100 ppm, 1 to 80 ppm, 1 to 50 ppm, 1 to 30 ppm, or 1 to 10 ppm.

In one aspect of the present invention, the content of Reb.C is 0 to 300 ppm, 1 to 300 ppm, 1 to 200 ppm, 1 to 150 ppm, 1 to 100 ppm, 1 to 80 ppm, 1 to 50 ppm, 1 to 30 ppm, or 1 to 10 ppm.

In one aspect of the present invention, the content of Reb.E is 0 to 300 ppm, 1 to 300 ppm, 1 to 200 ppm, 1 to 150 ppm, 1 to 100 ppm, 1 to 80 ppm, 1 to 50 ppm, or 1 to 30 ppm.

In one aspect of the present invention, the content of Reb.F is 0 to 300 ppm, 1 to 300 ppm, 1 to 200 ppm, 1 to 150 ppm, 1 to 100 ppm, 1 to 80 ppm, 1 to 50 ppm, or 1 to 30 ppm.

In one aspect of the present invention, the content of Reb.G is 0 to 300 ppm, 1 to 300 ppm, 1 to 200 ppm, 1 to 150 ppm, 1 to 100 ppm, 1 to 80 ppm, 1 to 50 ppm, or 1 to 30 ppm.

In one aspect of the present invention, the content of Reb.I is 0 to 300 ppm, 1 to 300 ppm, 1 to 200 ppm, 1 to 150 ppm, 1 to 100 ppm, 1 to 80 ppm, 1 to 50 ppm, or 1 to 30 ppm.

In one aspect of the present invention, the content of Reb.J is 0 to 300 ppm, 1 to 300 ppm, 1 to 200 ppm, 1 to 150 ppm, 1 to 100 ppm, 1 to 80 ppm, 1 to 50 ppm, or 1 to 30 ppm.

In one aspect of the present invention, the content of Reb.K is 0 to 300 ppm, 1 to 300 ppm, 1 to 200 ppm, 1 to 150 ppm, 1 to 100 ppm, 1 to 80 ppm, 1 to 50 ppm, or 1 to 30 ppm.

In one aspect of the present invention, the content of Reb.M is 0 to 300 ppm, 1 to 300 ppm, 1 to 200 ppm, 1 to 150 ppm, 1 to 100 ppm, 1 to 80 ppm, 1 to 50 ppm, or 1 to 30 ppm.

In one aspect of the present invention, the content of Reb.N is 0 to 300 ppm, 1 to 300 ppm, 1 to 200 ppm, 1 to 150 ppm, 1 to 100 ppm, 1 to 80 ppm, 1 to 50 ppm, or 1 to 30 ppm.

In one aspect of the present invention, the content of Reb.O is 0 to 300 ppm, 1 to 300 ppm, 1 to 200 ppm, 1 to 150 ppm, 1 to 100 ppm, 1 to 80 ppm, 1 to 50 ppm, or 1 to 30 ppm.

In one aspect of the present invention, the content of Reb.Q is 0 to 300 ppm, 1 to 300 ppm, 1 to 200 ppm, 1 to 150 ppm, 1 to 100 ppm, 1 to 80 ppm, 1 to 50 ppm, or 1 to 30 ppm.

In one aspect of the present invention, the content of Reb.R is 0 to 300 ppm, 1 to 300 ppm, 1 to 200 ppm, 1 to 150 ppm, 1 to 100 ppm, 1 to 80 ppm, 1 to 50 ppm, or 1 to 30 ppm.

In one aspect of the present invention, the content of dulcoside A is 0 to 300 ppm, 1 to 300 ppm, 1 to 200 ppm, 1 to 150 ppm, 1 to 100 ppm, 1 to 80 ppm, 1 to 50 ppm, or 1 to 30 ppm.

In one aspect of the present invention, the content of rubusoside is 0 to 300 ppm, 1 to 300 ppm, 1 to 200 ppm, 1 to 150 ppm, 1 to 100 ppm, 1 to 80 ppm, 1 to 50 ppm, or 1 to 30 ppm.

In one aspect of the present invention, the content of steviol monoside is 0 to 300 ppm, 1 to 300 ppm, 1 to 200 ppm, 1 to 150 ppm, 1 to 100 ppm, 1 to 80 ppm, 1 to 50 ppm, or 1 to 30 ppm.

In one aspect of the present invention, the content of steviol bioside is 0 to 300 ppm, 1 to 300 ppm, 1 to 200 ppm, 1 to 150 ppm, 1 to 100 ppm, 1 to 80 ppm, 1 to 50 ppm, or 1 to 30 ppm.

In one aspect of the present invention, the content of stevioside is 0 to 300 ppm, 1 to 300 ppm, 1 to 200 ppm, 1 to 150 ppm, 1 to 100 ppm, 1 to 80 ppm, 1 to 50 ppm, or 1 to 30 ppm.

In another aspect of the present invention, the beverage according to the present invention may comprise sweeteners other than the steviol glycosides. Such sweeteners are not especially limited, but the beverage may further comprise, for example, one or more sweeteners selected from the group consisting of sucrose, fructose-glucose syrup, erythritol, mogroside V, corn syrup, aspartame (also called an L-phenylalanine compound), sucralose, acesulfame potassium, saccharin and xylitol. Among these, from the viewpoint of imparting refreshing taste, easy drinkability, natural flavor and moderate rich taste, use of natural sweeteners is preferable, and particularly fructose-glucose syrup, sucrose and corn syrup are suitably used. These sweetness components may be used singly or in a plurality thereof. These sweeteners may be contained in the beverage in an amount corresponding to Brix in terms of sucrose of 5.0 or lower, 4.5 or lower, 4.0 or lower, 3.5 or lower, 3.0 or lower, 2.5 or lower, 2.0 or lower, 1.5 or lower, 1.0 or lower, or 0.5 or lower; and the lower limit value thereof may be 0.1 or higher.

The gas pressure in the case where the beverage according to the present invention is a sparkling beverage is not especially limited, but may be 2.2 kgf/cm$^2$ to 5.0 kgf/cm$^2$. In another aspect of the present invention, the gas pressure of the effervescent beverage is 2.2 kgf/cm$^2$ to 4.5 kgf/cm$^2$, 2.2 kgf/cm$^2$ to 4.0 kgf/cm$^2$, 2.2 kgf/cm$^2$ to 3.5 kgf/cm$^2$, 2.2 kgf/cm$^2$ to 3.3 kgf/cm$^2$, 2.2 kgf/cm$^2$ to 3.2 kgf/cm$^2$, 2.3 kgf/cm$^2$ to 4.0 kgf/cm$^2$, 2.3 kgf/cm$^2$ to 3.5 kgf/cm$^2$, 2.3 kgf/cm$^2$ to 3.2 kgf/cm$^2$, 3.0 kgf/cm$^2$ to 4.0 kgf/cm$^2$, or 3.0 kgf/cm$^2$ to 3.5 kgf/cm$^2$. The content of gas in the sparkling beverage can be specified by the gas pressure. In the present description, the "gas pressure" refers to, unless otherwise specified, a gas pressure of carbon dioxide gas in the beverage in a container after the temperature of the beverage is made 20° C. and thereafter air in the head space is once atmospherically released (snifted). Therefore, the beverage according to the present invention can be bottled in containers. With regard to the containers, those of any form and any material can be used; the containers may be, for example, glass bottles, cans, casks, PET bottles or the like. The measurement of the gas pressure can be carried out by fixing a beverage whose temperature is made 20° C. to a gas internal-pressure gauge, once opening a stopcock of the internal-pressure gauge for atmospheric release to release carbon dioxide gas in the head space, thereafter again closing the stopcock, and reading an indicated value when the pointer reaches a certain position by shaking the gas internal-pressure gauge. In the present description, unless otherwise specified, the gas pressure of a sparkling beverage is measured by this method.

Brix in terms of sucrose of the beverage according to the present invention is not especially limited, but is preferably 1 to 15, more preferably 3 to 14, still more preferably 5 to 13, and especially preferably 7 to 11. Here, Brix can be calculated from the sweetness level of each sweetener such as the steviol glycoside with respect to sucrose and the content of each sweetener. Any of Reb.A, Reb.D and Reb.M has sweetness about 300 times that of sucrose. Therefore, the amount of a steviol glycoside corresponding to a Brix of 1 can be calculated, for Reb.A, Reb.D and Reb.M, to be about 33.3 ppm. Also for other steviol glycosides and sweeteners other than steviol glycosides, Brix can be calculated similarly. For example, acesulfame potassium has sweetness about 200 times that of sucrose; sucralose, about 600 times; and aspartame, about 180 times. Here, the relative ratios of sweetness of various sweeteners with respect to 1 of the sweetness of sucrose can be determined from well-known sugar sweetness conversion tables (for example, "Inryo Yogo Jiten ("Dictionary of Beverage Terminology" in Japanese)", p. 11, published by Beverage Japan, Inc.), or the like. However, for sweeteners whose sweetness values are described in numerical ranges or are different literature by literature, the relative ratios of sweetness with respect to 1 of the sweetness of sucrose are determined by a sensory test. Examples of such a sensory test include a method of preparing samples containing sugar added in pure water so as to give Brix of 3.0 to 5.0 in 0.5 increments, and choosing, from among these, a sugar-added sample having the same sweetness intensity as an aqueous solution of a sweetener in a predetermined concentration.

The beverage according to the present invention may comprise an alcohol. Although an alcoholic beverage refers to a beverage containing an alcohol, the alcohol used here means, unless otherwise specified, ethyl alcohol (ethanol). The alcoholic beverage according to the present invention is indifferent specially to its kind as long as the beverage contains an alcohol. The alcoholic beverage may be one whose alcohol content is 0.05 to 40 v/v %, 1.0 to 10 v/v %, 2.0 to 9.0 v/v % or 3.0 to 8.0 v/v %, such as beer, low-malt beer, Chu-hi (Shochu (Japanese distilled liquor) high-ball) or a cocktail, or may be one whose alcohol content is lower than 0.05 v/v %, such as a non-alcoholic beer, a Chu-hi taste drink or a soft drink. The alcohol content of the beverage according to the present invention is preferably lower than 0.05 v/v %, and more preferably 0.00 v/v %. In the present description, the alcohol content is indicated in a percentage (v/v %) in terms of volume/volume. The alcohol content of a beverage can be measured by any well-known method, and can be measured, for example, by a vibration-type densitometer.

Flavor of the beverage according to the present invention is not especially limited, and can be adjusted variously. The beverage according to the present invention may be, for example, of orange flavor, lemon flavor, lime flavor, grape flavor, ginger ale flavor, cassis flavor, green tea flavor, oolong tea flavor, black tea flavor, coffee flavor or cola flavor. The flavor of the beverage according to the present invention can be adjusted by adding components approved as food additives or components which, even though not being approved, have had eaten experience from old times and are generally recognized as safe, such as fruit juices, sour agents, flavoring agents, extracts from plants, milk products and other flavors. In one aspect of the present invention, the beverage according to the present invention is not a beer-taste beverage.

The beverage according to the present invention may further comprise one or more selected from the group consisting of caramel, cinnamaldehyde, phosphoric acid, vanilla and caffeine. By making these components to be contained, the foam retention can further be improved. Here, the caffeine may be a purified product (having a caffeine content of 98.5% or higher) allowed to be used as a food additive, a crudely purified product (having a caffeine content of 50 to 98.5%) allowed to be used as a food, and besides, may be in a form of an extract or concentrate of a plant (tea leaves, cola nuts, coffee beans, guarana and the like). In one aspect of the present invention, the content of caffeine in the beverage can be made to be 1 to 200 ppm. The quantitative determination of caffeine may be carried out by any method, but can be carried out, for example, by filtering a beverage through a membrane filter (manufactured by Advantec Co., Ltd., a cellulose acetate membrane of 0.45 μm), and putting the specimen on high performance liquid chromatography (HPLC).

In another aspect of the present invention, the beverage according to the present invention can comprise cinnamaldehyde. Here, the cinnamaldehyde ($C_6H_5CH\!=\!CH\!-\!CHO$, molecular weight: 132.16) is one kind of aromatic aldehydes known as a fragrance component of cinnamon, and is commercially available as flavoring agent preparations. In one aspect of the present invention, the beverage can comprise cinnamaldehyde in an amount in a specific range. The content of cinnamaldehyde in the beverage according to the present invention can be made to be, for example, 0.5 to 50 ppm, preferably 0.5 to 32 ppm and 1.0 to 20 ppm. The quantitative determination of cinnamaldehyde can be carried out, for example, by a method using gas chromatography, a mass spectrometer or the like.

Further in another aspect, the beverage according to the present invention can comprise caramel (or caramel color). Here, as the caramel, a well-known caramel color suitable for food can be used. There can be used, for example, a caramel obtained by heat treating a food hydrocarbon represented by sugar or glucose, a caramel obtained by adding an acid or an alkali to a food hydrocarbon and heat treating the resultant, or the like. Further, a caramel can also be used which is obtained by caramelizing sugar contents contained in fruit juices and vegetable juices; in this case, the caramelization of the sugar contents can be carried out by heat treatment, acid or alkali treatment, or the like. The beverage according to the present invention can comprise the caramel color in a content in a specific range.

In another aspect of the present invention, the beverage according to the present invention does not substantially comprise caramel. By making caramel not substantially to be contained, coloration of the beverage can be suppressed. In the present description, "not substantially comprising caramel" includes the case where such a small amount of caramel as not affecting the color of the beverage is contained as an impurity.

In the beverage according to the present invention, foam is stabilized. For example, foam generated when the beverage according to the present invention is poured in a container is retained for a longer time than in usual beverages. The foam retention of a beverage can be evaluated as follows.
(1) Reb.D and Glycoside A in predetermined amounts are added to water to prepare an aqueous solution, and the aqueous solution (150 mL) is put in a glass bottle, which is then stoppered.
(2) The glass bottle having the aqueous solution put therein is left static in a refrigerator (4° C.) for 3 hours or longer.
(3) The glass bottle is taken out from the refrigerator and stopper is opened; thereafter, a measuring cylinder is covered on the opening side of the glass bottle as shown in FIG. 1(a); the glass bottle and the measuring cylinder may be fixed with a masking tape or the like as long as not being sealed.
(4) While the state of (3) of the glass bottle and the measuring cylinder is kept, the whole is gently rotated over about 2 s so that the measuring cylinder comes to the lower side.
(5) Measurement is started by setting the time point when the whole of the aqueous solution in the glass bottle has moved to the measuring cylinder side, as the measurement starting time of the foam retention time.
(6) The time until foam on the aqueous solution assumes a predetermined state is measured as the foam retention time. Here, the "predetermined state" can suitably be determined based on the size and the like of the instruments used for the measurement; and for example, a state in which foam is in about three rows on the inner wall periphery of the measuring cylinder as shown in FIG. 1(b) may be defined as the "predetermined state".

It is preferable, in the case of measuring the foam retention time by the above method, that the foam retention time of the beverage according to the present invention be 20 s or longer. In one aspect of the present invention, the foam retention time of the beverage is 20 s to 3,000 s, preferably 100 to 3,000 s, and more preferably 500 to 3,000 s.

The beverage according to the present invention may be prepared as a container-bottled beverage in the state of being bottled in a container. The container is not especially limited, and examples thereof include PET bottles, aluminum cans, steel cans, paper packs, chilled cups and bottles. In the case of carrying out heat sterilization, the kind thereof is not especially limited, and the sterilization can be carried out by usual means of, for example, UHT sterilization or retort sterilization. The temperature of the heat sterilization process is not especially limited, but is, for example, 65 to 130° C., and preferably 85 to 120° C., for 10 to 40 min. Here, sterilization at a suitable temperature for several seconds, for example, 5 to 30 s, poses no problem as long as the same sterilizing value as in the above condition is obtained.

The energy (total energy quantity) of the beverage according to the present invention is not especially limited, but can be 0 to 50 Kcal/100 ml, 0 to 45 Kcal/100 ml, 0 to 40 Kcal/100 ml, 0 to 35 Kcal/100 ml, 0 to 30 Kcal/100 ml, 0 to 24 Kcal/100 ml, 0 to 22 Kcal/100 ml, 0 to 20 Kcal/100 ml, 0 to 15 Kcal/100 ml, 0 to 10 Kcal/100 ml, 0 to 5 Kcal/100 ml, 0.1 to 50 Kcal/100 ml, 0.1 to 45 Kcal/100 ml, 0.1 to 40 Kcal/100 ml, 0.1 to 35 Kcal/100 ml, 0.1 to 30 Kcal/100 ml, 0.1 to 24 Kcal/100 ml, 0.1 to 22 Kcal/100 ml, 0.1 to 20 Kcal/100 ml, 0.1 to 15 Kcal/100 ml, 0.1 to 10 Kcal/100 ml, 0.1 to 5 Kcal/100 ml, 1 to 50 Kcal/100 ml, 1 to 45 Kcal/100 ml, 1 to 40 Kcal/100 ml, 1 to 35 Kcal/100 ml, 1 to 30 Kcal/100 ml, 1 to 24 Kcal/100 ml, 1 to 22 Kcal/100 ml, 1 to 20 Kcal/100 ml, 1 to 15 Kcal/100 ml, 1 to 10 Kcal/100 ml, 1 to 5 Kcal/100 ml, 5 to 50 Kcal/100 ml, 5 to 45 Kcal/100 ml, 5 to 40 Kcal/100 ml, 5 to 35 Kcal/100 ml, 5 to 30 Kcal/100 ml, 5 to 24 Kcal/100 ml, 5 to 20 Kcal/100 ml, 5 to 15 Kcal/100 ml, 5 to 10 Kcal/100 ml, 10 to 50 Kcal/100 ml, 10 to 45 Kcal/100 ml, 10 to 40 Kcal/100 ml, 10 to 35 Kcal/100 ml, 10 to 30 Kcal/100 ml, 10 to 24 Kcal/100 ml, 10 to 20 Kcal/100 ml, 10 to 15 Kcal/100 ml, 15 to 50 Kcal/100 ml, 15 to 45 Kcal/100 ml, 15 to 40 Kcal/100 ml, 15 to 35 Kcal/100 ml, 15 to 30 Kcal/100 ml, 15 to 24 Kcal/100 ml, 15 to 20 Kcal/100 ml, 20 to 50 Kcal/100 ml, 20 to 45 Kcal/100 ml, 20 to 40 Kcal/100 ml, 20 to 35 Kcal/100 ml, 20 to 30 Kcal/100 ml, 20 to 24 Kcal/100 ml, 24 to 50 Kcal/100 ml, 24 to 45 Kcal/100 ml, 24 to 40 Kcal/100 ml, 24 to 35 Kcal/100 ml, or 24 to 30 Kcal/100 ml.

A method for producing the beverage according to the present invention is not especially limited, and the beverage can be produced by usual methods for producing beverages. For example, the method may involve preparing a syrup having concentrated components contained in the beverage according to the present invention and adding a sparkling or non-sparkling drinking water thereto to adjust the components to predetermined concentrations, or adding a non-sparkling drinking water and thereafter supplying carbon dioxide gas to prepare a sparkling beverage. Alternatively, the beverage according to the present invention may be prepared, without preparing a syrup like the above, by adding predetermined components directly to a beverage.

2. A Method for Improving Foam Retention in a Beverage

A second aspect of the present invention is to provide a method for improving foam retention in a beverage. The method for improving foam retention in a beverage according to the present invention comprises adding, to a beverage, rebaudioside D, and a compound represented by Formula (1) below:

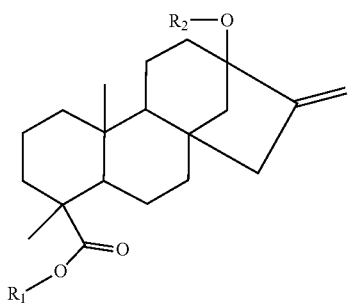

(1)

wherein $R_1$ represents Xyl(1-2)Glc1-; and $R_2$ represents Glc(1-2)[Glc(1-3)]Glc1-, where Glc represents glucose, and Xyl represents xylose, or a salt or a hydrate thereof. In the present description, "adding, to a beverage, rebaudioside D, and a compound represented by Formula (1), or a salt or a hydrate thereof" is that Reb.D and Glycoside A are made to be contained in the beverage; and a method of making sweetness substances in predetermined amounts to be contained is not especially limited. Therefore, Reb.D and Glycoside A may be previously blended as raw materials in production of a beverage, or may be separately added after production of a beverage, or may be generated by decomposition or the like of raw materials blended.

The method for improving foam retention according to the present invention may comprise other steps other than the above step. In one aspect of the present invention, the method may comprise a step of making the total content of rebaudioside D and a compound represented by Formula (1), or a salt or a hydrate thereof in the beverage to be 30 to 600 ppm and making the content of a compound represented by Formula (1), or a salt or a hydrate thereof with respect to the total content to be 0.5 to 95% in terms of mass.

The method for improving foam retention in another aspect of the present invention may comprise a step of preparing a beverage in which the total content of Reb.D and Glycoside A may be 40 to 600 ppm, 50 to 600 ppm, 70 to 600 ppm, 80 to 600 ppm, 90 to 600 ppm, 100 to 600 ppm, 110 to 590 ppm, 120 to 580 ppm, 130 to 570 ppm, 140 to 560 ppm, 150 to 550 ppm, 160 to 540 ppm, 170 to 530 ppm, 180 to 520 ppm, 190 to 510 ppm, 200 to 500 ppm, 210 to 490 ppm, 220 to 480 ppm, 230 to 470 ppm, 240 to 460 ppm, 250 to 450 ppm, 260 to 440 ppm, 270 to 430 ppm, 280 to 420 ppm, 290 to 410 ppm, 300 to 400 ppm, 300 to 350 ppm, 300 to 600 ppm, 310 to 590 ppm, 320 to 580 ppm, 330 to 570 ppm, 340 to 560 ppm, 350 to 550 ppm, 360 to 540 ppm, 370 to 530 ppm, 380 to 520 ppm, 390 to 510 ppm, 400 to 500 ppm, 380 to 520 ppm, 115 to 500 ppm, 120 to 470 ppm, 150 to 450 ppm, 180 to 420 ppm, 200 to 400 ppm, 220 to 380 ppm, 250 to 350 ppm, 250 to 500 ppm, 280 to 480 ppm, or 300 to 450 ppm, and is preferably 150 to 400 ppm, and more preferably 170 to 300 ppm.

A beverage to be used in the method for improving foam retention according to the present invention may comprise, as in "1. A beverage having foam retention", steviol glycosides other than Reb.D and Glycoside A, and sweeteners other than steviol glycosides. Each content and the ratio of Reb.D and Glycoside A, and the flavor, the gas pressure, pH and the like of the beverage may be also as in "1. A beverage having foam retention".

3. Use of a Combination of Reb.D and a Compound Represented by Formula (1), or a Salt or a Hydrate Thereof for Improving Foam Retention of a Beverage A third aspect of the present invention is to provide use of a combination of Reb.D and a compound represented by Formula (1), or a salt or a hydrate thereof (Glycoside A) for improving foam retention. The present inventors have found that a combination of Reb.D and Glycoside A as one kind of steviol glycoside astonishingly has an effect of improving foam retention of a beverage, and this finding has led to the present invention.

In use of a combination of Reb.D and Glycoside A for improving foam retention of the beverage according to the present invention, the combination of Reb.D and Glycoside A can be used in a total amount thereof with respect to the beverage which may be 30 to 600 ppm, 40 to 600 ppm, 50 to 600 ppm, 70 to 600 ppm, 80 to 600 ppm, 90 to 600 ppm, 100 to 600 ppm, 110 to 590 ppm, 120 to 580 ppm, 130 to 570 ppm, 140 to 560 ppm, 150 to 550 ppm, 160 to 540 ppm, 170 to 530 ppm, 180 to 520 ppm, 190 to 510 ppm, 200 to 500 ppm, 210 to 490 ppm, 220 to 480 ppm, 230 to 470 ppm, 240 to 460 ppm, 250 to 450 ppm, 260 to 440 ppm, 270 to 430 ppm, 280 to 420 ppm, 290 to 410 ppm, 300 to 400 ppm, 300 to 350 ppm, 300 to 600 ppm, 310 to 590 ppm, 320 to 580 ppm, 330 to 570 ppm, 340 to 560 ppm, 350 to 550 ppm, 360 to 540 ppm, 370 to 530 ppm, 380 to 520 ppm, 390 to 510 ppm, 400 to 500 ppm, 380 to 520 ppm, 115 to 500 ppm, 120 to 470 ppm, 150 to 450 ppm, 180 to 420 ppm, 200 to 400 ppm, 220 to 380 ppm, 250 to 350 ppm, 250 to 500 ppm, 280 to 480 ppm, or 300 to 450 ppm, and is preferably 150 to 400 ppm, and more preferably 170 to 300 ppm.

Each content and the ratio of Reb.D and Glycoside A, and the flavor, the gas pressure, pH and the like of the beverage may be also as in "1. A beverage having foam retention".

With regard to the foam retention time improved by use of sweetness substances selected from the group consisting of Reb.D, Glycoside A and combinations thereof for improving foam retention of the beverage according to the present invention, it is preferable, in the case where the foam retention time is measured by the method described in "1. A beverage having foam retention", that the foam retention time be 20 s or longer.

4. A Foam Retention Improving Agent

A fourth aspect of the present invention is to provide a foam retention improving agent. In the present description, the "foam retention improving agent" refers to, in the case of being added to a beverage, a substance for improving foam retention of the beverage. The foam retention improving agent according to the present invention preferably can improve foam retention of a beverage without perception by consumers of taste of the foam retention improving agent itself when the foam retention improving agent is added to the beverage.

The foam retention improving agent according to the present invention comprises a combination of Reb.D and a compound represented by Formula (1), or a salt or a hydrate thereof. Further the foam retention improving agent according to the present invention may comprise, as in "1. A beverage having foam retention", steviol glycosides other than Reb.D and a compound represented by Formula (1), or a salt or a hydrate thereof, and sweeteners other than steviol glycosides as long as not inhibiting the effects of the present invention.

The amount of Reb.D and a compound represented by Formula (1), or a salt or a hydrate thereof contained in the foam retention improving agent according to the present invention is not especially limited, but may be, with respect to the total amount of the foam retention improving agent, 30 to 100 wt %, 40 to 99 wt %, 50 to 98 wt %, 60 to 97 wt %, 70 to 96 wt %, or 80 to 95 wt %. The foam retention improving agent according to the present invention may comprise substantially only Reb.D and Glycoside A. In the present description, "comprising substantially only Reb.D and Glycoside A" means that there are allowed to be included impurities such as other steviol glycosides inevitably contained in the preparation (purification of stevia extracts, biosynthesis or the like) process of Reb.D and Glycoside A. There are allowed to be contained steviol glycosides other than Reb.D and Glycoside A and other impurities, for example, with respect to the total weight of the foam retention improving agent, in 5 wt % or lower, 4 wt % or lower, 3 wt % or lower, 2 wt % or lower, 1.5 wt % or lower, 1.0 wt % or lower, or 0.5 wt % or lower.

The content of a compound represented by Formula (1), or a salt or a hydrate thereof (Glycoside A) in the foam retention improving agent in one aspect of the present invention may be 0.5 to 95% in terms of mass with respect to the total content of rebaudioside D and the compound represented by Formula (1), or a salt or a hydrate thereof in the beverage. In another aspect of the present invention, the proportion of Glycoside A may be 1.0 to 95%, 1.5 to 95%, 2.0 to 95%, 2.5 to 95%, 3.0 to 95%, 3.5 to 95%, 4.0 to 95%, 4.5 to 95%, 5.0 to 95%, 0.5 to 90%, 1.0 to 90%, 1.5 to 90%, 2.0 to 90%, 2.5 to 90%, 3.0 to 90%, 3.5 to 90%, 4.0 to 90%, 4.5 to 90%, 5.0 to 90%, 0.5 to 80%, 1.0 to 80%, 1.5 to 80%, 2.0 to 80%, 2.5 to 80%, 3.0 to 80%, 3.5 to 80%, 4.0 to 80%, 4.5 to 80%, 5.0 to 80%, 0.5 to 70%, 1.0 to 70%, 1.5 to 70%, 2.0 to 70%, 2.5 to 70%, 3.0 to 70%, 3.5 to 70%, 4.0 to 70%, 4.5 to 70%, 5.0 to 70%, 0.5 to 60%, 1.0 to 60%, 1.5 to 60%, 2.0 to 60%, 2.5 to 60%, 3.0 to 60%, 3.5 to 60%, 4.0 to 60%, 4.5 to 60%, 5.0 to 60%, 0.5 to 50%, 1.0 to 50%, 1.5 to 50%, 2.0 to 50%, 2.5 to 50%, 3.0 to 50%, 3.5 to 50%, 4.0 to 50%, 4.5 to 50%, 5.0 to 50%, 0.5 to 40%, 1.0 to 40%, 1.5 to 40%, 2.0 to 40%, 2.5 to 40%, 3.0 to 40%, 3.5 to 40%, 4.0 to 40%, 4.5 to 40%, 5.0 to 40%, 0.5 to 30%, 1.0 to 30%, 1.5 to 30%, 2.0 to 30%, 2.5 to 30%, 3.0 to 30%, 3.5 to 30%, 4.0 to 30%, 4.5 to 30%, 5.0 to 30%, 0.5 to 25%, 1.0 to 25%, 1.5 to 25%, 2.0 to 25%, 2.5 to 25%, 3.0 to 25%, 3.5 to 25%, 4.0 to 25%, 4.5 to 25%, 5.0 to 25%, 20 to 95%, 25 to 95%, 30 to 95%, 35 to 95%, 40 to 95%, 45 to 95%, 50 to 95%, 55 to 95%, 60 to 95%, 65 to 95%, 70 to 95%, 75 to 95%, 80 to 95%, 85 to 95%, 25 to 90%, 25 to 85%, 25 to 80%, 25 to 75%, 25 to 70%, 25 to 65%, 25 to 60%, 25 to 55%, 25 to 50%, 25 to 45%, 25 to 40%, 25 to 35%, or 40 to 60%.

Hereinafter, the present invention will be described more specifically by way of Examples, but the present invention is not limited to these Examples.

EXAMPLES

[Example A] Evaluation of Foam Retention in Various Reb.D: Glycoside A Ratios

In order to evaluate foam retention of the beverage according to the present invention, there were prepared aqueous solutions of example 1 to example 13 described in Table 1 by varying the ratio of Glycoside A and Reb.D. Raw materials used were as follows. The contents of a purified Reb.D product and Glycoside A were calculated from respective amounts added. This applies similarly to the following Tables.

Raw Materials

Water (solvent): ion-exchange water

Purified Reb.D product: a purified Reb.D product of a purity of 93%

Glycoside A: a compound of Formula (3) prepared by the method as described in the scheme 1 in the present description Evaluation of foam retention of the aqueous solutions of example 1 to example 13 was carried out by using the following instruments and according to the following steps (1) to (6).

Instruments Used 300-mL measuring cylinder (manufactured by IWAKI), height: 33.5 cm, diameter: 45 mm 180-mL glass bottle container (manufactured by Nihon Yamamura Glass Co., Ltd., PS-W180), opening diameter: about 20 mm Evaluation Steps (1) The purified Reb.D product and Glycoside A in predetermined amounts were added to the water to prepare an aqueous solution, and the aqueous solution (150 mL) was put in the glass bottle, which was then stoppered.

(2) The glass bottle having the aqueous solution put therein was left static in a refrigerator (4° C.) for 3 hours or longer.

(3) The glass bottle was taken out from the refrigerator and stopper was opened; thereafter, the measuring cylinder was covered on the opening side of the glass bottle as shown in FIG. 1(a). The distance from the measuring cylinder bottom to the glass bottle opening was about 28 cm.

(4) While the state of (3) of the glass bottle and the measuring cylinder was kept, the whole is gently rotated over about 2 s so that the measuring cylinder came to the lower side.

(5) Measurement was started by setting the time point when the whole of the aqueous solution in the glass bottle had moved to the measuring cylinder side, as the measurement starting time of the foam retention time.

(6) There was measured as the foam retention time, the time until foam on the aqueous solution assumed foam in about three rows on the inner wall periphery of the measuring cylinder as shown in FIG. 1(b).

Figure 2B:
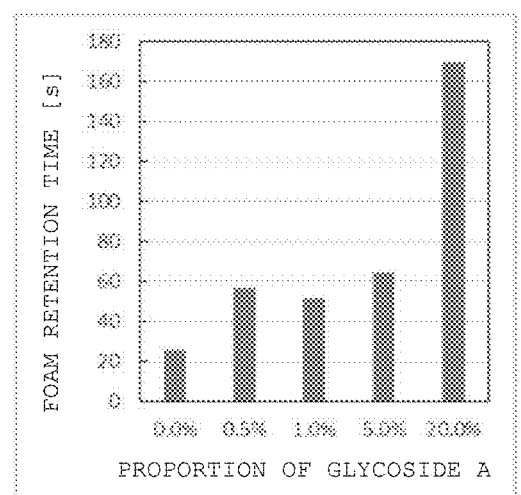
Figure 3:
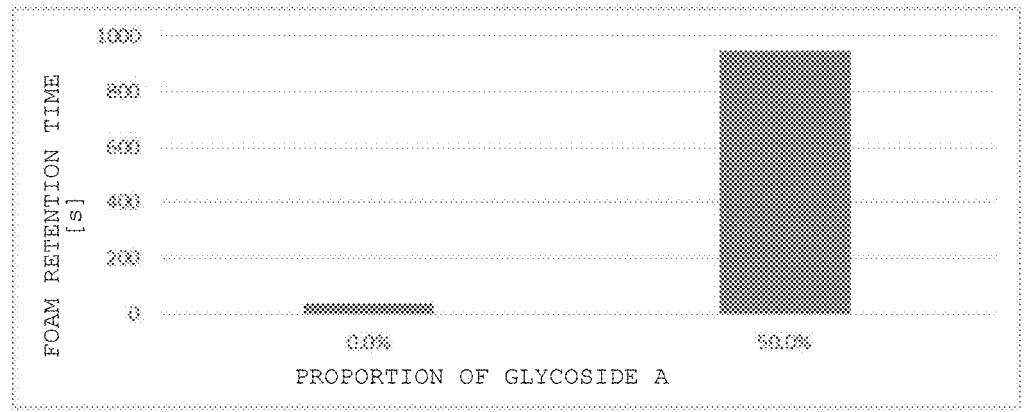
FIG. 3 is a graph showing the foam retention effect in a sparkling beverage (carbonated beverage).

Acquired results are shown in Table 1 and FIGS. 2(a) and 2(b). The foam retention time was an average value of N=2 to 5. FIG. 2(a) shows comparison among examples in which proportions of Glycoside A to the purified Reb.D product were high (25% or higher); FIG. 2(b) shows comparison among examples in which proportions of Glycoside A to the purified Reb.D product were low (20% or lower). From these results, it is found that the cases where the proportions of Glycoside A to the purified Reb.D product were 0.5% or higher exhibited prolonged foam retention times.

TABLE 1

Foam Retention of Aqueous Solutions of Various Glycoside A: Reb.D Ratios

| Example | 1 | 2 | 3 | 4 | 5 | 6 | 7 | 8 | 9 | 10 | 11 | 12 | 13 |
|---|---|---|---|---|---|---|---|---|---|---|---|---|---|
| Proportion of Glycoside A | 0.0% | 0.5% | 1.0% | 5.0% | 20.0% | 25.0% | 30.0% | 35.0% | 40.0% | 45.0% | 50.0% | 95.0% | 100.0% |
| Total Content [ppm] | 250 | 250 | 250 | 250 | 250 | 250 | 250 | 250 | 250 | 250 | 250 | 250 | 250 |
| Purified Reb.D Product [ppm] | 250.00 | 248.75 | 247.50 | 237.50 | 200.00 | 187.50 | 175.00 | 162.50 | 150.00 | 137.50 | 125.00 | 12.50 | 0.00 |
| Glycoside A [ppm] | 0.00 | 1.25 | 2.50 | 12.50 | 50.00 | 62.50 | 75.00 | 87.50 | 100.00 | 112.50 | 125.00 | 237.50 | 250.00 |
| Brix in terms of Sucrose | 7.95 | 7.96 | 7.97 | 8.04 | 8.33 | 8.42 | 8.52 | 8.61 | 6.95 | 6.82 | 6.70 | 5.57 | 5.45 |
| Foam Retention Time (s) | 26 | 57 | 51.5 | 64.5 | 170 | 590 | 948.5 | 1618.5 | 1635 | 1782 | 2697.5 | 2940 | 2440.2 |

[Example B] Evaluation of Foam Retention in Various Total Contents

In order to evaluate foam retention depending on the total content of Reb.D and Glycoside A, aqueous solutions of example 14 to example 18 described in Table 2 were prepared by a similar method as in Example A. Raw materials used were the same as in Example A, and an evaluation method used was also the same as in Example A. Results are shown in Table 2.

TABLE 2

Evaluation of Foam Retention in Various Total Contents

| Example | 14 | 15 | 16 | 17 | 18 |
|---|---|---|---|---|---|
| Proportion of Glycoside A | 50.0% | 50.0% | 50.0% | 50.0% | 50.0% |
| Total Content [ppm] | 250 | 100 | 50 | 25 | 10 |
| Purified Reb.D Product [ppm] | 125.00 | 50.00 | 25.00 | 12.50 | 5.00 |
| Glycoside A [ppm] | 125.00 | 50.00 | 25.00 | 12.50 | 5.00 |
| Brix in terms of Sucrose | 6.70 | 3.56 | 1.78 | 0.89 | 0.36 |
| Foam Retention Time (s) | 2697.5 | 145.5 | 30.5 | 12 | 12 |

From the results of Table 2, it is found that in the cases where the total content of Reb.D and Glycoside A exceeded 25 ppm, the foam retention time was improved.

[Example C] Evaluation of Foam Retention in Carbonated Beverages

The foam retention was evaluated also for carbonated beverages. The evaluation of the foam retention was carried out by the same method as in Example A, except for, when the foam retention was evaluated, using a 500-mL measuring cylinder (manufactured by Sibata Scientific Technology Ltd., height: 36 cm, diameter: 55 mm) in place of the 300-mL measuring cylinder, using carbonated water (5 kgf/cm$^2$) in place of the ion-exchange water, and carrying out the preparation of aqueous solutions in bottles. Results are shown in Table 3.

TABLE 3

Evaluation of Foam Retention in Carbonated Beverages

| Example | 19 | 20 |
|---|---|---|
| Proportion of Glycoside A | 0.0% | 50.0% |
| Total Content [ppm] | 250 | 250 |
| Purified Reb.D Product [ppm] | 250.00 | 125.00 |
| Glycoside A [ppm] | 0.00 | 125.00 |
| Brix in terms of Sucrose | 7.95 | 6.70 |
| Foam Retention Time (s) | 36 | 946 |

As indicated in Table 3, it is found that also in carbonated beverages, a combination of Reb.D and Glycoside A improved the foam retention.

[Example D] Examination of the Influence of Glycoside A on Lingering Sweet Aftertaste In order to examine the influence of Glycoside A on lingering sweet aftertaste, samples (examples 21 to 26) described in Table 5, in which the proportion of Glycoside A and the purified Reb.D product was varied, were prepared. When the concentration dependence of Glycoside A was in advance checked, since it was found that the sweetness level of Glycoside A varied depending on the concentration, sweetnesses of the samples 21 to 26 were made even by using the values of the sweetness level described in Table 4 at each concentration. On the other hand, since it was known that Reb.D exhibited the proportional relation between the concentration and the sweetness-corresponding amount in the following experimental concentration range (J. Agric. Food Chem. 2012, 60, 6782-6793), in the present Example, the sweetness level of the purified Reb.D product was set at 318. Here, one panelist trained about the sensory attribute of sweeteners confirmed that the Brix in terms of sucrose of each sample was nearly the same in the preparation of the samples.

TABLE 4

Values of Sweetness Level at each Concentration

| | lower than 100 ppm | 100 ppm or higher |
|---|---|---|
| Purified Reb.D Product | —[1] | 318 |
| Glycoside A | 394 | 225 |

[1]In the present Example, a sample containing Reb.D in this concentration was not used.

The sensory evaluation of the each aqueous solution obtained was carried out according to the following procedure by 8 panelists trained about the sensory attribute of sweeteners.

1) Each sample stored at room temperature was poured in a cup.
2) A sample of 0.0% in proportion of Glycoside A (that is, sample having purified Reb.D product alone) was set as the reference of a score of 3 in lingering sweet aftertaste.
3) Evaluation was carried out by holding 10 ml of the each sample in the panelist's mouth. After the evaluation, the sample was spit out. The sensory evaluation was carried out with the sample content in a secret (blind) state; and before the start of the sensory evaluation and between the sensory evaluation for every sample, the mouth was fully rinsed (4 times or more). Evaluation of each sample was carried out according to the following criteria.

Figure 4:
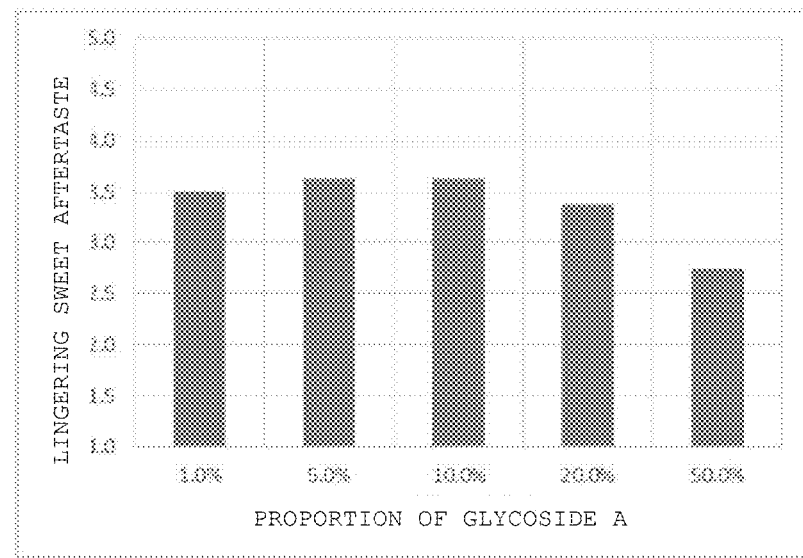
FIG. 4 is a graph showing the lingering sweet aftertaste evaluation result in various proportions of Glycoside A.

Score of 1: the lingering sweet aftertaste was long
Score of 2: the lingering sweet aftertaste was slightly long
Score of 3: the lingering sweet aftertaste did not vary
Score of 4: the lingering sweet aftertaste was slightly short
Score of 5: the lingering sweet aftertaste was short Average values of acquired results are shown in Table 5 and FIG. 4.

TABLE 5

Influence of Glycoside A on Lingering Sweet Aftertaste

| Example | 21 | 22 | 23 | 24 | 25 | 26 |
|---|---|---|---|---|---|---|
| Proportion of Glycoside A | 0.0% | 1.0% | 5.0% | 10.0% | 20.0% | 50.0% |
| Total Concentration [ppm] | 189 | 188 | 187 | 185 | 180 | 221 |
| Purified Reb.D Product [ppm] | 189.0 | 186.1 | 177.7 | 166.5 | 144.0 | 110.5 |
| Glycoside A [ppm] | 0.0 | 1.9 | 9.4 | 18.5 | 36.0 | 110.5 |
| Brix in terms of Sucrose | 6.01 | 5.99 | 6.02 | 6.02 | 6.00 | 6.00 |
| Sensory Evaluation Result | | | | | | |
| Lingering Sweet Aftertaste | 3.0 (reference) | 3.5 | 3.6 | 3.6 | 3.4 | 2.8 |

From the above results, it is found that in the case where the content of Glycoside A was 20% or lower with respect to the total content of Reb.D and Glycoside A, an especially strong effect of improving the lingering sweet aftertaste was attained.

The invention claimed is:

1. A beverage comprising:
rebaudioside D; and
a compound represented by Formula (1) below:

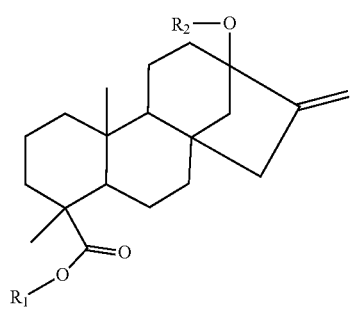

(1)

wherein $R_1$ represents Xyl(1-2)Glc1-; and $R_2$ represents Glc(1-2)[Glc(1-3)]Glc1-, where Glc represents glucose, and Xyl represents xylose,
or a salt or a hydrate thereof;
wherein a total content of the rebaudioside D and the compound of Formula (1), or a salt or a hydrate thereof is 30 to 600 ppm; and
a content of the compound of Formula (1), or a salt or a hydrate thereof is 0.5 to 95% in terms of mass with respect to the total content.

2. The beverage according to claim 1, wherein a content of rebaudioside D is 10 to 300 ppm.

3. The beverage according to claim 1, wherein the content of the compound of Formula (1), or a salt or a hydrate thereof is 1 to 400 ppm.

4. The beverage according to claim 1, wherein the total content is 150 to 400 ppm.

5. The beverage according to claim 1, wherein the content of the compound of Formula (1), or a salt or a hydrate thereof is 0.5 to 25% in terms of mass with respect to the total content.

6. The beverage according to claim 1, wherein the content of the compound of Formula (1), or a salt or a hydrate thereof is 25% to 95% in terms of mass with respect to the total content.

7. The beverage according to claim 1, wherein the compound of Formula (1) is a compound represented by Formula (3) below:

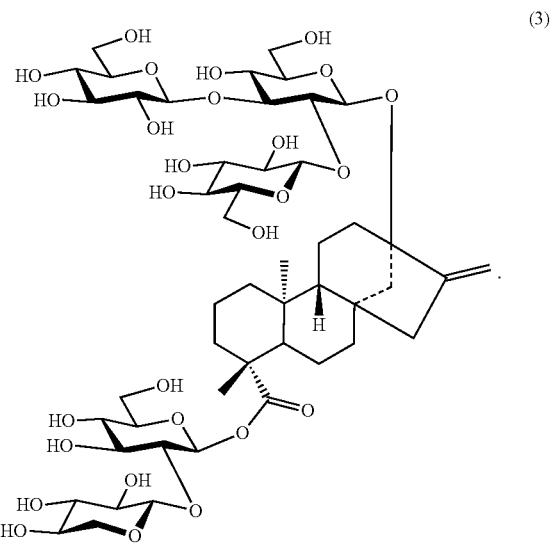

(3)

8. The beverage according to claim 1, further comprising one or more steviol glycosides selected from the group consisting of rebaudioside A, rebaudioside B, rebaudioside C, rebaudioside E, rebaudioside F, rebaudioside G, rebaudioside I, rebaudioside J, rebaudioside K, rebaudioside M, rebaudioside N, rebaudioside O, rebaudioside Q, rebaudioside R, dulcoside A, rubusoside, steviol monoside, steviol bioside and stevioside.

9. The beverage according to claim 1, wherein the beverage is a sparkling beverage.

10. The beverage according to claim 1, having Brix in terms of sucrose of 1 to 13.

11. The beverage according to claim 1, having an alcohol content of lower than 0.05 v/v %.

12. A method for improving foam retention of a beverage, comprising adding rebaudioside D and a compound represented by Formula (1) below:
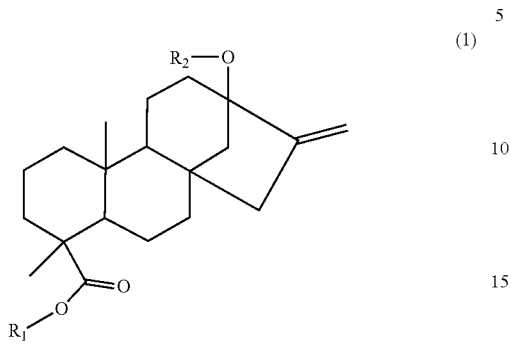
wherein $R_1$ represents Xyl(1-2)Glc1-; and $R_2$ represents Glc(1-2)[Glc(1-3)]Glc1-, where Glc represents glucose, and Xyl represents xylose,
or a salt or a hydrate thereof;
to the beverage.
* * * * *